May 27, 1969   C. L. DILL, JR   3,447,029
CONTINUOUS HEADLAMP LIGHTING WITH GENERATOR
POWER DURING VEHICLE OPERATION
Filed Sept. 8, 1967

INVENTOR.
CHARLES L. DILL JR.
BY

United States Patent Office 3,447,029
Patented May 27, 1969

3,447,029
CONTINUOUS HEADLAMP LIGHTING WITH GENERATOR POWER DURING VEHICLE OPERATION
Charles L. Dill, Jr., Miami, Fla., assignor to Edward M. Long, Miami, Fla.
Filed Sept. 8, 1967, Ser. No. 666,281
Int. Cl. B60q 1/04, 1/26
U.S. Cl. 315—80                              4 Claims

ABSTRACT OF THE DISCLOSURE

Solid state means connected in a vehicular electric circuit for energizing frontal lights when the generator in the vehicle is driven by the engine thereof.

This invention relates in general to electric headlight illumination for vehicles and more particularly to a solid state circuit means for automatically energizing the low beam filaments of headlights when the engine of the vehicle is in operation.

Reference is had to applicant's pending applications, Ser. Nos. 550,783 and 601,358, with filing dates of May 17, 1966 and Dec. 13, 1966, respectively.

Prior to the above and the present invention, the energizing of any of the forward lights of a vehicle were dependent upon manual operation when conditions for normal visibility, such as nightfall, fog, rainstorms and other conditions of poor visibility prevailed.

It is a matter of substantial accuracy that in view of the high speed conditions on our present highways and expressways, a high percentage of accidents have been averted by driving with headlights energized during daylight hours and to this end the present invention is directed.

The present invention overcomes the necessity for manually energizing the low beam vehicle lights by the automatic operation of a solid state circuit means, which will energize the low beam lights directly from the generator of the engine, which construction is a principal object of the invention.

Another object of the invention is the provision of a solid state circuit means for connection to the voltage regulator of an alternating current generating system for auomatically energizing the low beam filaments of the headlights when the generator is operating.

A further object of the invention is the provision of a solid state circuit means for connection to a direct current generator for automatically energizing the low beam filaments of the headlights when the generator is operated.

These and other objects and advantages in two embodiments of the invention are described and shown in the following specification and drawing, in which.

Figure 1:
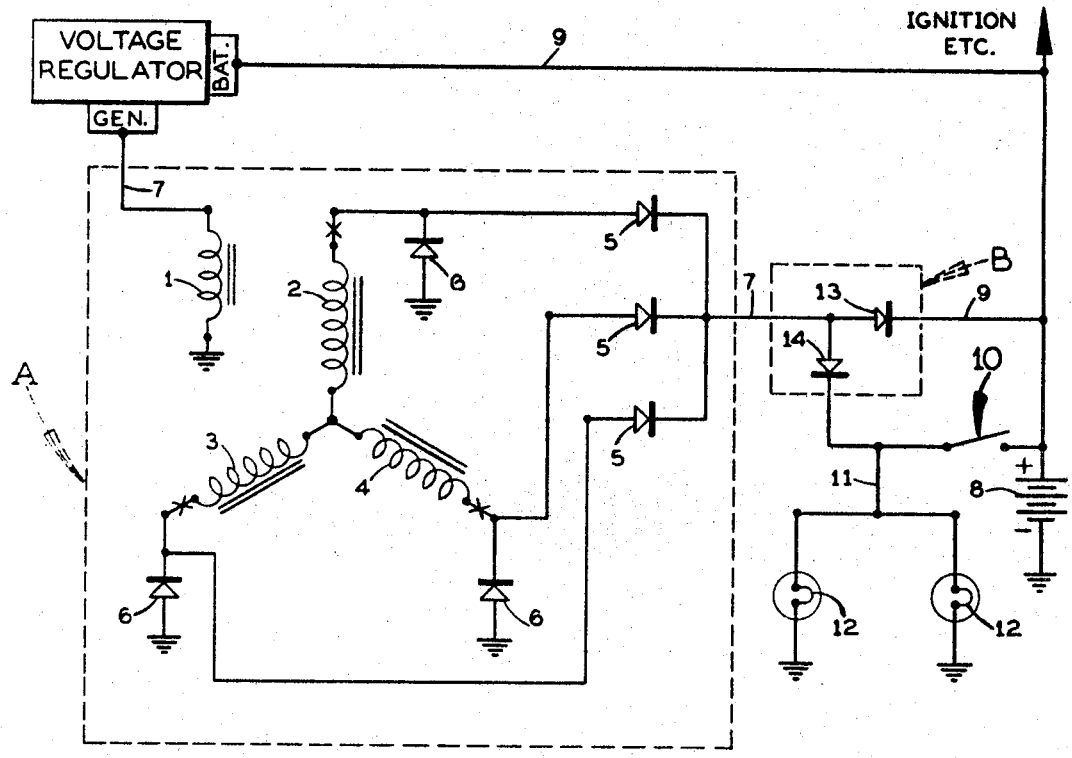
FIG. 1 is a schematic circuit diagram of a conventional alternating current generator for charging a vehicle battery and energizing the electric circuit thereof including a solid state control means for energizing frontal vehicle lights.

The schematic circuit diagram shown in FIG. 1 illustrates an alternating current generator system for a vehicle including a storage battery and a diode means for energizing a pair of filaments in the frontal lights of the vehicle when the alternator is driven by the engine thereof.

The broken line outline (A) contains a schematic diagram of the generator having a field winding 1 and star connected rotor or armature windings 2, 3 and 4 with each winding terminating in a slip ring means, illustrated by an (x).

A pair of diode rectifiers 5 and 6 are inversely connected to each of the slip rings of the windings 2, 3, and 4 for providing full wave rectification to the output of the generator and supplying a main output conductor 7 with direct current, with respect to the common ground of the vehicle.

A storage battery 8, having the negative terminal thereof connected to the common ground, has the positive terminal thereof connected to the voltage regulator by a conductor 9, which conductor also connects to the ignition and other power circuits of the vehicle.

The low beam portion of a manual light switch 10 has one terminal connected to conductor 9 and the remaining terminal connected by a conductor 11 to one terminal of each filament 12 of the frontal low beam lights of the vehicle. The remaining filament terminals are connected to ground.

The light energizing attachment is illustrated in broken line rectangle (B), which includes diodes 13 and 14. The collector element of the diode 13 is connected to conductor 9 and the collector element of diode 14 is connected to conductor 11. The emitter electrodes of both diodes 13 and 14 are connected to conductor 7.

In operation and under the assumption that the generator is driven by the engine of the vehicle, the regulator will automatically adjust the current in the field winding 1 to suit the condition of the battery, in a well known manner. The diode 13 will permit a direct current to flow into conductor 9 and charge the battery and the diode 14 will permit current to flow through conductor 11 and automatically energize both of the light filaments 12, regardless of the open or closed position of the manual light switch 10.

It is apparent that when the engine is idle and the generator stopped, reverse current is prevented from flowing into the generator by the unidirectional characteristics of the diodes 13 and 14 in rectangle attachment (B).

Figure 2:
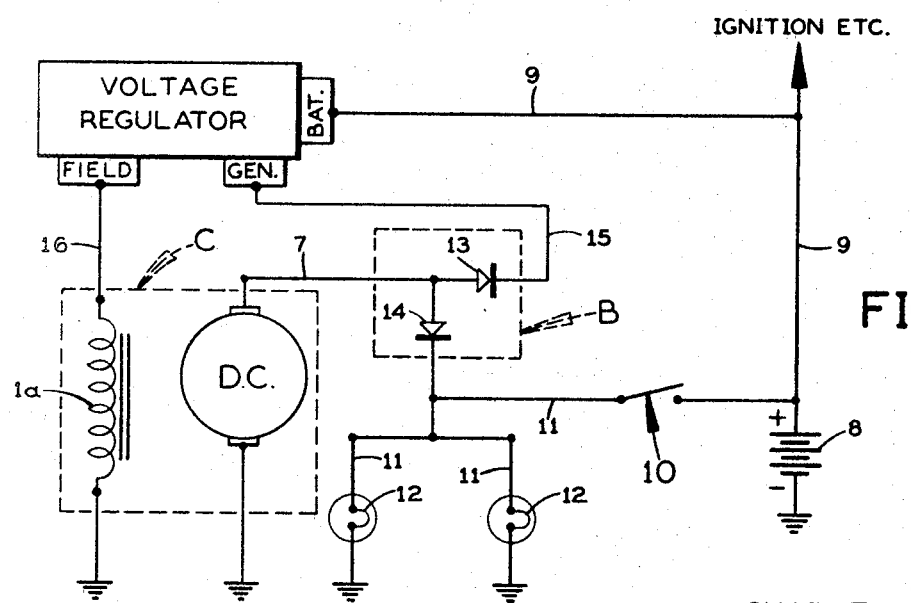
FIG. 2 is a schematic circuit diagram of a direct current generator for charging a vehicle battery and energizing the circuit connected thereto including a solid state control means for automatically energizing frontal vehicle lights.

FIG. 2 illustrates a direct current alternating system in a vehicle circuitry wherein the dotted outline C contains a conventional D.C, generator having a field 1a. A voltage regulator is shown for controlling the vehicle battery charge.

The battery 8 has the negative terminal thereof connected to a common ground and the positive terminal connected to the battery terminal of the voltage regulator by conductor 9, as shown in FIG. 1, and also to one terminal of the low beam portion of the manual light switch 10. The dotted line enclosure B illustrates the attachment shown in FIG. 1 containing diodes 13 and 14. The collector electrode of diode 13 is connected to the generator terminal of the voltage regulator by a conductor 15 and the collector electrode of diode 14 is connected to one terminal of each light filament 12 by the conductor 11. The remaining terminals of the light filaments are connected to ground. One terminal of the generator field 1a is connected to the field terminal of the voltage regulator by a conductor 16 and the remaining terminal thereof connected to ground.

In operation and under the assumption that the generator is driven by the engine of the vehicle then the voltage regulator will adjust the current in field 1a to provide the appropriate charge for the battery 8, as previously described. Simultaneously, the filaments 12 of the lights will be energized by the unidirectional flow of current through diode 14 and the generator is protected from motoring when the engine is idle by the unidirectional characteristics of diodes 13 and 14, which prevent battery current from energizing the generator.

It is to be understood that generators of both the A.C. and D.C. variety with permanent magnet fields and winding means for controlling the output thereof are intended to effectively utilize the diodes in broken line rectangle B and other modifications employing the features above described are intended to come within the scope of the appended claims.

Having described my invention, I claim:

1. A solid state device for energizing frontal lights on a vehicle comprising an alternating current generator adapted and constructed to be driven by the engine of the said vehicle,
   a solid state rectifying means connected to said generator for converting the alternating current output thereof to direct current and terminating in a positive terminal and a common ground,
   a storage battery having the negative terminal thereof connected to said common ground,
   a main circuit means for said vehicle having a common ground connection including a main positive conductor connected to the positive output terminal of said rectifying means and the positive terminal of said battery,
   a pair of filaments of said frontal lights having one terminal of each thereof connected to said common ground,
   a light control unit comprising two diodes with the emitter electrodes of both diodes connected to the said positive terminal of said rectifying means and the collector element of one of said diodes connected to said main conductor and the collector element of the other said diode connected to the remaining terminals of the filaments of said lights whereby the operation of said engine and generator will simultaneously charge said battery through said one diode and said second diode will energize the filaments of said lights.

2. The construction recited in claim 1 including a manual switch for manual movement from an open to a closed position,
   said switch having one terminal thereof connected to said main conductor and the remaining terminal thereof connected to said remaining terminals of said filaments whereby said filaments may be energized by said battery when said engine and generator are idle and said switch is closed, 3. A solid state device for energizing frontal lights on a vehicle comprising a direct current generator having one terminal thereof connected to a common ground,
   said generator having one terminal of the field winding thereof connected to said ground,
   a storage battery having one terminal thereof connected to said ground,
   a pair of filaments of said frontal lights with one terminal of each connected to said ground,
   a voltage regulator for said generator having a field and a generator and a battery terminal,
   a conductor connecting the remaining terminal of said battery to the said battery terminal of said voltage regulator,
   a conductor connecting the remaining terminal of said field winding to said field terminal of said voltage regulator,
   a light control unit including a pair of diodes with the emitter elements of each of said diodes connected to the remaining terminal of said generator,
   the collector element of one of said diodes connected to said generator terminal of said voltage regulator,
   the collector element of the other said diode connected to the remaining terminals of both said filaments of said lights whereby the electric output of said generator will operate said voltage regulator and energize said filaments and simultaneously charge said battery under the regulation of said regulator when said engine and generator are operated.

4. The construction recited in claim 3 including a manual switch having open and closed positions with one terminal thereof connected to the said remaining battery terminal and the other terminal of said switch connected to the said remaining terminals of said filaments for energizing the latter by moving said switch to said closed position when said generator and engine are idle.

References Cited

UNITED STATES PATENTS

| 3,262,011 | 7/1966 | Cones | 315—82 |
| 3,348,095 | 10/1967 | Gold | 315—80 |

FOREIGN PATENTS

| 602,773 | 6/1948 | Great Britain. |

ROBERT SEGAL, *Primary Examiner.*